Sept. 6, 1960

G. H. KOCH 2,951,634

VENTILATING AND SUPPORTING STRUCTURE FOR
MOTORS OF REVERSIBLE FANS
Filed June 30, 1958

INVENTOR
GUSTAV H. KOCH
BY
ATTORNEY

United States Patent Office 2,951,634
Patented Sept. 6, 1960

2,951,634

VENTILATING AND SUPPORTING STRUCTURE FOR MOTORS OF REVERSIBLE FANS

Gustav H. Koch, Springfield, Mass., assignor to Westinghouse Electric Corporation, East Pittsburgh, Pa., a corporation of Pennsylvania Filed June 30, 1958, Ser. No. 745,516

4 Claims. (Cl. 230—259)

This invention relates to fan apparatus, and more particularly to a ventilating and supporting structure for electrically reversible motors supported within the casing of a ventilating fan.

Motors are required to develop a relatively large power output for a small volume of material; and, unless heat is dissipated from the motor, the motor temperature will rise to a value inconsistent with a reasonable motor life. The problem of dissipating motor heat by the conventional method of passing air through the motor is especially complicated in electrically reversible fans having a bladed hub which is mounted on the motor shaft and which extends rearwardly, encompassing or overlapping a front end portion of the motor. While such a hub and motor arrangement provides minimum overall depth from front to rear, the hub prevents any appreciable portion of the air being forced rearwardly by the fan from passing through the motor. There is also involved the problem of providing means for supporting the motor within a circular opening in the fan casing.

The invention is applied to fans comprising a motor having a bladed hub mounted on the forwardly extending portion of the motor shaft, and wherein the stator core and the stator windings of the motor are held between spaced front and rear end-covers. The end covers also support bearings in which is journaled a shaft carrying a rotor. In accordance with the invention the rear end-cover is provided with air passages in a central region thereof and has an annular skirt portion which extends radially outwardly and forwardly beyond the radial extent of the stator core and windings, thus providing an air scoop which diverts a portion of the air forced rearwardly by the fan blades through and over rear end portions of the stator windings, whereby effective internal cooling of the motor is accomplished. Because efficient cooling of the motor is accomplished, a smaller motor than would otherwise be required for rotating the fan blades can be employed. In addition, the outer margin of the rear end-cover skirt provides a convenient location at which motor supporting members of the apparatus housing can be secured. The rear end-cover is, thus, used as a mounting ring, as well as an air scoop, thereby reducing the manufacturing cost of the fan.

The various objects, features, and advantages of the invention will appear more fully from the detailed description which follows, taken in connection with the accompanying drawings, forming a part of this application, in which.

Figure 1:
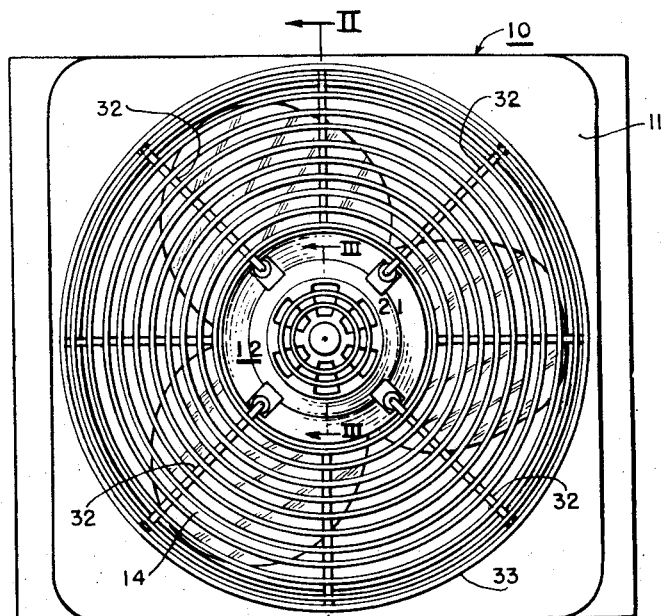
Fig. 1 is a rear elevational view of a ventilating fan embodying the invention.

The invention is shown as applied to a reversible ventilating fan of the type adapted for mounting in a window frame, although it is applicable to various other kinds of fans.

The ventilating fan embodying the invention comprises a housing 10 formed of sheet metal which may be rested upon a window ledge or otherwise mounted in an opening in a wall of a room. The housing 10 includes a vertical wall 11 provided with a circular opening of large diameter and the housing is hollow so that an air passage is formed, whereby air may be propelled through the opening by a fan 12 mounted therein.

The fan 12 comprises an electrically reversible electric motor 13 and a propeller fan 14 including a hub 16 mounted on a forwardly extending portion of the motor shaft 17.

The motor 13 comprises a stator core 18 held between front and rear end-covers 19 and 21, respectively. The end-covers 19 and 21 carry front and rear bearings 22 and 23, respectively, in which is journaled the shaft 17 carrying a rotor 24. The stator core 18 comprises annular laminations stacked in face-to-face relation and formed with longitudinal slots which carry the stator windings 26 in a manner well known in the motor art.

Broadly stated, the end covers 19 and 21 are, generally, dished elements provided with built-up sections or bosses wherever additional material is required, such as for accommodating the bearings 22 and 23, and through-bolts 28. In addition, the end-covers 19 and 21 are provided with apertures to permit the longitudinal passage of air therethrough for the purpose of cooling the motor 13. The end-covers 19 and 21 are axially spaced apart, enclosing the opposite ends of the motor 13, but exposing at least a portion of the stator core 18 and thus providing another opening and another path for the circulation of cooling air through and over the stator windings 26.

Figure 2:
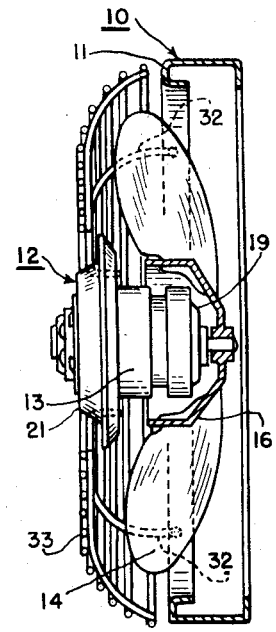
Fig. 2 is a vertical sectional view taken along line II—II of Fig. 1, but showing the motor in elevation.
Figure 3:
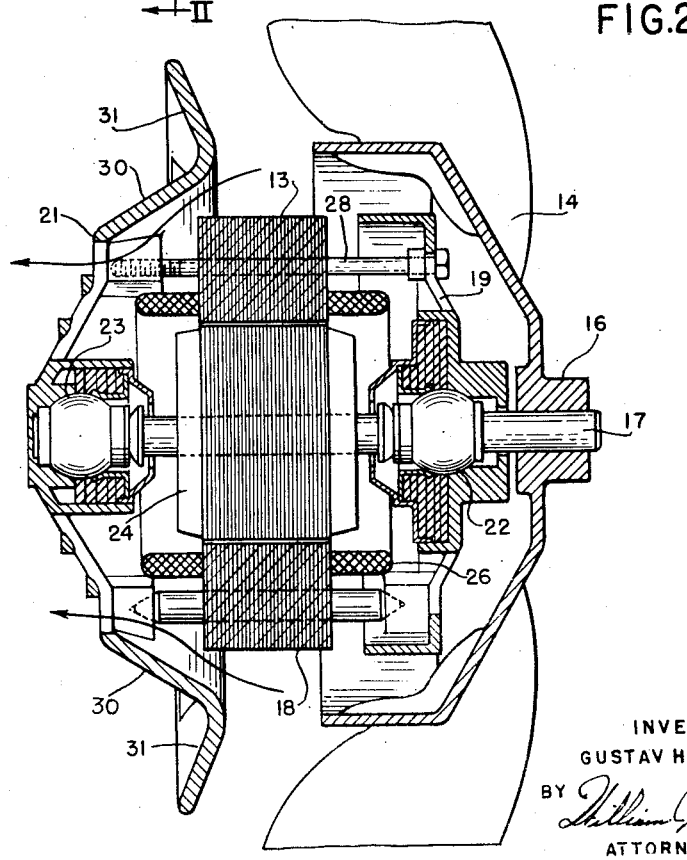
Fig. 3 is an enlarged vertical sectional view of a motor and bladed hub, taken along line III—III of Fig. 1.

The motor 13 is effectively cooled when air is propelled forwardly, or from left to right as seen in Figs. 2 and 3, because air continuously approaching the rear of the apparatus is not diverted from the apertures in the rear end-cover 21 and the air entering these apertures accomplishes appreciable cooling of the stator windings 26. It will be noted that some air passing forwardly through the motor 13 will exit directly through the opening between the end-covers 19 and 21, while other portions of the air will pass longitudinally through the motor, and out through the apertures in the front end-cover 19.

When the fan is propelling air from front to rear, or from right to left as shown in Figs. 2 and 3, it is particularly difficult to force some of the air through the motor 13 because air propelled by the fan 14 tends to flow parallel to the shaft 17, thereby creating a relatively stagnant air pocket between the hub 16 and the rear end-cover 21. It will be noted that the hub 16 encompasses the front end-cover 19 and extends rearwardly in overlapping relation therewith, whereby the overall depth of the apparatus, from front to rear is minimized, but at the sacrifice of efficient circulation of cooling air through the motor 13.

In accordance with the present invention, effective cooling of the motor is accomplished when the fan is forcing air rearwardly, by means of a novel construction of the rear end-cover 21. The rear end-cover 21 includes a trumpet-shaped skirt portion 30 which extends forwardly and radially outwardly from the end-plate proper, terminating outwardly of the outer periphery of the stator core 13 and rearward of the hub 16. This construction of the end-cover 21 provides an air scoop which diverts a small but sufficient portion of the rearwardly moving air stream through and over the stator windings 26 to cool them. Further cooling of those portions of the stator windings 26, not directly contacted by the cooling air stream, is effected by conduction through the windings 26. The path of diverted rearwardly moving air is illustrated by the arrows in Fig. 3 and can be traced from the outer periphery of the fan hub 16, toward the air scoop from whence it is deflected downwardly and funneled through the space between the end-covers 19 and 21 into contact with the rear portion of the stator windings 26, and thence through the openings in a central region of the rear end-cover 21. The diverted air rejoins the main air stream after moving through the interior of the motor 13. It has been found, by test, that this arrangement reduces the temperature of the stator windings 26 as much as 15° C. and effectively increases the efficiency and life expectancy of motors using this construction.

A marginal or rim portion 31 of the rear end-cover skirt 30 flares outwardly and rearwardly, providing an effective location at which supporting members 32 can be secured. The supporting members 32 form part of a guard 33, of open-work construction, secured to the vertical plate 11 of the housing 10, which guard 33 prevents the user from inadvertently contacting the rotating fan 14.

It will be apparent from the foregoing that an effective motor ventilating and supporting structure has been incorporated in a rear end-cover 21 which, in prior art structures, served but one purpose. The use of the end plate as an air scoop to divert a portion of the air stream for cooling the stator windings permits the use of a smaller capacity, less expensive motor than would otherwise be permissible with conventional motor constructions. And the use of the rear end-cover 21 as a mounting ring further reduces the overall manufacturing cost of the apparatus by eliminating the need for a separate mounting ring.

While the invention has been shown in but one form, it will be obvious to those skilled in the art that it is not so limited, but is susceptible of various changes and modifications without departing from the spirit thereof.

What is claimed is:

1. Fan apparatus comprising a reversible motor including front and rear end-covers spaced apart to provide an opening therebetween, a shaft having an end extending forwardly of said front end-cover, a rotor carried by said shaft, and a stator disposed about said rotor, a propeller fan mounted on the forward end of said shaft to be driven thereby and having portions thereof extending rearwardly in overlapping relation with said front end-cover, and means connected to said rear end-cover for supporting said motor, said rear end-cover being provided with a plurality of apertures through which air is admitted for cooling said motor when air is propelled forwardly, said rear end-cover having a skirt portion extending forwardly and outwardly at least beyond the outer periphery of said stator, said skirt portion being spaced rearwardly from said overlapping fan portions; whereby a portion of the air forced rearwardly by said fan, when said motor is reversed, is diverted through the motor by said skirt portion.

2. Fan apparatus comprising a reversible motor including front and rear end-covers spaced axially apart to provide an opening therebetween, a shaft journaled in said end-covers and extending forwardly therefrom, a rotor carried by said shaft, and a stator disposed annularly about said rotor, a propeller fan including a hub mounted on the forward end of said shaft to be driven thereby, said hub having portions thereof extending rearwardly in overlapping relation with said front end-cover, and means connected to said rear end-cover for supporting said motor, said rear end-cover being provided with a plurality of apertures through which air is admitted for cooling said motor when air is propelled forwardly, said rear end-cover having a trumpet-shaped skirt portion extending forwardly and outwardly at least beyond the outer periphery of said stator, said skirt portion being spaced rearwardly from said overlapping hub portions; whereby a portion of the air forced rearwardly by said fan, when said motor is reversed, is diverted by said skirt portion into the opening between said end-covers, over a portion of said stator, and out the apertured portion of said rear end-cover.

3. Fan apparatus comprising a housing provided with an air passage, a reversible motor including front and rear end-covers spaced axially apart to provide an opening therebetween, a shaft journaled in said end-covers and extending forwardly therefrom, a rotor carried by said shaft, and a stator disposed annularly about said rotor in spaced relation therewith, a propeller fan including a hub mounted on the forward end of said shaft to be driven thereby, said hub having portions thereof extending rearwardly in overlapping relation with said front end-cover, said rear end-cover being apertured and having an integral, trumpet-shaped skirt portion extending forwardly and outwardly at least beyond the outer periphery of said stator, said skirt portion being spaced rearwardly from said overlapping hub portions, and means connected to said housing and the skirt portion of said rear end-cover for supporting said motor and said fan in position to force air either rearwardly or forwardly through said air passage; the construction and arrangement being such that when air is forced rearwardly by said fan a portion thereof is diverted by said skirt portion into the opening between said end-covers, over at least a portion of said stator, and out the apertured portion of said rear end-cover.

4. Fan apparatus comprising a housing provided with an air passage, a reversible motor including front and rear end-covers spaced axially apart to provide an opening therebetween, a shaft journaled in said end-covers and extending forwardly therefrom, a rotor carried by said shaft, and a stator disposed annularly about said rotor in spaced relation therewith, a propeller fan including a hub mounted on the forward end of said shaft to be driven thereby, said hub having portions thereof extending rearwardly in overlapping relation with said front end-cover, said rear end-cover being apertured and having an integral, trumpet-shaped skirt portion extending forwardly and outwardly at least beyond the outer periphery of said stator, said skirt portion being spaced rearwardly from said overlapping hub portions, and a fan guard of open-work construction connected to said housing and the skirt portion of said rear end-cover and defining a cantilevered mounting for supporting said motor and said fan in position to force air either rearwardly or forwardly through said air passage; the construction and arrangement being such that when air is forced rearwardly by said fan a portion of this air is diverted by said skirt portion into the opening between said end-covers, over a portion of said stator, and out the apertured portion of said rear end-cover.

References Cited in the file of this patent

UNITED STATES PATENTS

| | | |
|---|---|---|
| 1,920,315 | Myers | Aug. 1, 1933 |
| 2,193,408 | Knight | Mar. 12, 1940 |
| 2,202,622 | Brown | May 28, 1940 |
| 2,294,586 | Troller | Sept. 1, 1942 |
| 2,314,696 | Funk | Mar. 23, 1943 |
| 2,394,517 | Ingalls | Feb. 5, 1946 |
| 2,397,171 | Troller et al. | Mar. 26, 1946 |
| 2,516,184 | Christie | July 25, 1950 |
| 2,622,793 | Ganger et al. | Dec. 23, 1952 |